United States Patent
Fan et al.

(10) Patent No.: US 9,798,691 B2
(45) Date of Patent: Oct. 24, 2017

(54) CONTROL CIRCUITRY MODULE GROUP, ELECTRIC DEVICE AND MODEM DEVICE

(71) Applicant: Tyco Electronics (Shanghai) Co. Ltd., Shanghai (CN)

(72) Inventors: Mingjie Fan, Shanghai (CN); Junying Liu, Daqing (CN); Yuming Song, Shanghai (CN); Donghua Zhu, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 281 days.

(21) Appl. No.: 14/391,703

(22) PCT Filed: Apr. 8, 2013

(86) PCT No.: PCT/IB2013/052795
§ 371 (c)(1),
(2) Date: Oct. 9, 2014

(87) PCT Pub. No.: WO2013/153502
PCT Pub. Date: Oct. 17, 2013

(65) Prior Publication Data
US 2015/0143007 A1 May 21, 2015

(30) Foreign Application Priority Data
Apr. 10, 2012 (CN) .......................... 2012 1 0102264

(51) Int. Cl.
*G06F 13/00* (2006.01)
*G06F 13/40* (2006.01)
(Continued)

(52) U.S. Cl.
CPC .......... *G06F 13/4068* (2013.01); *G06F 1/266* (2013.01); *G06F 1/3203* (2013.01);
(Continued)

(58) Field of Classification Search
CPC ....... H04B 3/542; G06F 1/266; G06F 13/364; G06F 1/3203; G06F 13/4022; G06F 13/287; G06F 13/4068
(Continued)

(56) References Cited

U.S. PATENT DOCUMENTS

2007/0078629 A1* 4/2007 Gollhardt ........... G05B 23/0208
702/183
2008/0114914 A1  5/2008 Cloutier et al.
2012/0039217 A1* 2/2012 Halsall .............. H04L 12/40032
370/255

FOREIGN PATENT DOCUMENTS

EP      1672810 A1    6/2006
WO   WO 2011/087681 A1   7/2011

OTHER PUBLICATIONS

International Search Report and Written Opinion issued by the European Patent Office, dated Aug. 26, 2013, for International Application No. PCT/IB2013/052795; 16 pages.
(Continued)

*Primary Examiner* — Chun-Kuan Lee
(74) *Attorney, Agent, or Firm* — Faegre Baker Daniels LLP

(57) ABSTRACT

The present invention relates to a control circuitry module group, an electrical device, and a modem device. The control circuitry module group is configured for communication and/or power supply between a master control module and at least one slave modules in an electrical device. The control circuitry module group comprises: a bus; a bus control module coupled to the master control module and the bus, configured to receive a control signal from the master control module, add a target address in the control signal, and send to the bus the control signal with the target address; and at least one slave control modules each coupled to a corresponding slave module and the bus, respectively, and
(Continued)

configured to receive the control signal with the target address via the bus, and controlling power supply to the slave module in response to the control signal.

17 Claims, 6 Drawing Sheets

(51) Int. Cl.
  *H04B 3/54* (2006.01)
  *G06F 1/32* (2006.01)
  *G06F 13/28* (2006.01)
  *G06F 13/364* (2006.01)
  *G06F 1/26* (2006.01)

(52) U.S. Cl.
  CPC .......... *G06F 13/287* (2013.01); *G06F 13/364* (2013.01); *G06F 13/4022* (2013.01); *H04B 3/542* (2013.01); *H04B 2203/5416* (2013.01); *H04B 2203/5483* (2013.01)

(58) Field of Classification Search
  USPC ........................................................ 710/110
  See application file for complete search history.

(56) References Cited

OTHER PUBLICATIONS

International Preliminary Report on Patentability issued by The International Bureau of WIPO, Geneva, Switzerland, dated Oct. 14, 2014 for International Application No. PCT/IB2013/052795; 10 pages.

* cited by examiner

CONTROL CIRCUITRY MODULE GROUP, ELECTRIC DEVICE AND MODEM DEVICE

FIELD OF THE INVENTION

The present invention relates to the field of electrical technology, and more specifically to a control circuitry module group, an electrical device provided with the control circuitry module group, and a modem device.

BACKGROUND OF THE INVENTION

With the development of electronic technologies, more and more electric devices have integrated various hardware modules so as to implement different functions. Such hardware modules are for example electric heaters, fans, motors, or sensors. In order to control operations of these hardware modules, a master control panel of an electrical device should be connected to respective hardware modules so as to supply power thereto. Besides, a switch or relay for controlling power supply to the hardware modules is typically also integrated on the master control panel.

However, for a traditional electrical device, in order to realize the electrical connection between the above master control panel and hardware modules, different hardware modules have to be connected to the master control panel via a separate connection wire, which results in too many interfaces on the master control panel and too many connection wires led out from these interfaces, respectively. Such a control circuitry is complex in structure, poor in scalability, and costly in maintenance.

SUMMARY OF THE INVENTION

Based on the above analysis, it is desirable to provide a simply structured control circuitry for an electrical device.

In order to solve the above problem, according to one aspect of the present invention, there is provided a control circuitry module group configured for communication and/or power supply between a master control module and at least one slave modules in an electrical device. The control circuitry module group includes a bus; a bus control module coupled to the master control module and the bus, and configured to receive a control signal from the master control module, add a target address in the control signal and transmit to the bus the control signal with the target address; and at least one slave control modules each coupled to a respective slave module and the bus, and configured to receive the control signal with the target address via the bus, and control power supply to the slave module in response to the control signal.

It may be seen that since the connection between each slave module and the master control module of the electrical device is coupled via the bus, it is unnecessary for the master control module to set an individual interface for each slave module to connect the slave module. This effectively reduces the complexity of the control circuitry and improves the scalability of the system.

In one embodiment, the slave control module is further configured to receive a feedback signal from the slave module and provide the feedback signal to the bus control module via the bus; and the bus control module is further configured to receive the feedback signal and provide the feedback signal to the master control module.

In one embodiment, the bus further includes a power bus coupled between a power source line and the at least one slave control modules and configured to provide power supply to the slave control module.

In one embodiment, the bus control module includes a first signal processing unit configured to add the target address in the control signal, wherein the target address indicates an address of a slave control module corresponding to the control signal.

In one embodiment, the slave control module includes a second signal processing unit configured to generate a power source switching signal based on the control signal; and a power source switching unit coupled between the slave module and the power source line, and configured to switch a connection between the slave module and the power source line in response to the power source switching signal.

In one embodiment, the second signal processing unit is further configured to receive a feedback signal and provide the feedback signal to the bus.

In one embodiment, the power source switching unit includes a relay or a controllable switch.

In one embodiment, the control circuitry module group is a power line carrier communication circuitry, and the bus is configured for communication and power supply between the master control module and the at least one slave modules. It may be seen that different from the prior art, it is unnecessary for the control circuitry module according to the embodiment to use an additional data signal circuitry to transmit data signals, which effectively reduces the amount of wiring harnesses within an electrical device. Moreover, since the control circuitry module uses a bus to transmit a data signal and supply power between the master control module and the slave module, it is unnecessary for the master control module to set an individual interface for each slave module to connect the slave module, which further reduces the amount of wiring harnesses and reduces the complexity of the control circuitry module group.

In one embodiment, the bus control unit includes a first signal processing unit configured to add the target address in the control signal, wherein the target address indicates an address of a slave control module corresponding to the control signal; a first modem unit coupled to the first signal processing unit, and configured to modulate and/or demodulate the control signal and/or a feedback signal from the slave control module; and a first coupling unit coupled between the first modem unit and the bus, and configured to interchange the modulated control signal and/or feedback signal between the first modem unit and the bus.

In one embodiment, the bus includes multiple bus branches, and the first coupling unit further includes a plurality of coupling sub-units, wherein each coupling sub-unit is coupled to one of the multiple bus branches; and wherein the bus control module further includes a multiplexing module with multiple data signal channels, configured to select one data signal channel from the multiple data signal channels so as to interchange signals between the first modem unit and the first signal processing unit.

In one embodiment, each of the coupling sub-units includes a primary coil and a secondary coil, wherein each secondary coil is coupled to one of the bus branches through a coupling capacitor.

In one embodiment, the first coupling unit includes a primary coil, each of the coupling sub-units includes a secondary coil, and the plurality of coupling sub-units share the primary coil, wherein each secondary coil is coupled to one of the bus branches via a coupling capacitor.

In one embodiment, the slave control module includes a second signal processing unit configured to generate a power source switching signal based on the control signal; a power source switching unit coupled between the slave module and the bus, and configured to switch a connection between the slave module and the bus in response to the power source switch signal; and a second modem unit coupled to the second signal processing unit, and configured to modulate and/or demodulate the control signal; and a second coupling unit coupled between the second modem unit and the bus, and configured to interchange the modulated control signal and/or feedback signal between the second modem unit and the bus.

According to another aspect of the present invention, there is further provided an electrical device including a control circuitry module group, a master control module, and at least one slave modules according to the above embodiments.

In one embodiment, the slave module includes a heating module, a heat-dissipation module, a motor, or a sensor.

According to a further aspect of the present invention, there is further provided a modem device configured for communication between a control module and a power circuitry in an electrical device, the power circuitry including a plurality of power lines, the modem device comprising a coupling unit, a modem unit, and a multiplexing unit, wherein the modem unit is coupled between the coupling unit and the multiplexing unit and configured to demodulate a modulated signal from the power circuitry into a data signal and provide it to the multiplexing unit, or configured to modulate a data signal from the multiplexing module into a modulated signal and provide it to the coupling unit; the coupling unit includes a plurality of coupling sub-units, wherein each coupling sub-unit is coupled to one power line of the power circuitry, respectively, and is configured to interchange modulated signals between the modem unit and the power circuitry; and the multiplexing module includes multiple data signal channels, configured to receive a selection signal and select one data signal channel from the multiple data signal channels in response to the control signal so as to interchange data signals between the modem unit and the control module.

Since the modem device has a multiplexing unit to implement switching between data signal channels, the modem device is only required to have one modem unit shared by the plurality of coupling sub-units included in the coupling unit. This may reduce used number of modem units, thereby reducing hardware costs.

In one embodiment, each of the coupling sub-units includes a primary coil and a secondary coil, wherein each secondary coil is coupled to one power line of the power circuitry via a coupling capacitor.

In one embodiment, the coupling unit includes a primary coil, each of the coupling sub-units includes a secondary coil, and the plurality of coupling sub-units share the primary coil, wherein each secondary coil is coupled to one power line of the power circuitry via a coupling capacitor.

The above and other features of the present invention will be explicitly explained in the embodiments below.

BRIEF DESCRIPTION OF THE SEVERAL VIEWS OF THE DRAWINGS

The above and other features of the present invention will become more apparent through detailed description of the embodiments as illustrated with reference to the accompanying drawings. In the accompanying drawings of the present invention, same or like reference signs indicate same or like components.

FIG. 1b shows an example of a bus control module in FIG. 1a;

FIG. 1c shows an example of a slave control module in FIG. 1a;

FIG. 3b shows an example of a bus control module in FIG. 3a;

FIG. 3c shows an example of a slave control module in FIG. 3a;

FIG. 4b shows an example of a bus control module in FIG. 4a; and

DETAILED DESCRIPTION OF THE INVENTION

The following detailed description of the preferred embodiments will refer to the accompanying drawings that form a part of the present invention. The accompanying drawings exemplarily show some specific embodiments capable of implementing the present invention. The exemplary embodiments are not intended to limit all embodiments according to the present invention. It may be appreciated that other embodiments may also be used, or structural or logical amendments may be made without departing from the scope of the present invention. Therefore, the following detailed description is not limitative, and the scope of the present invention is defined by the appending claims.

Figure 1A:
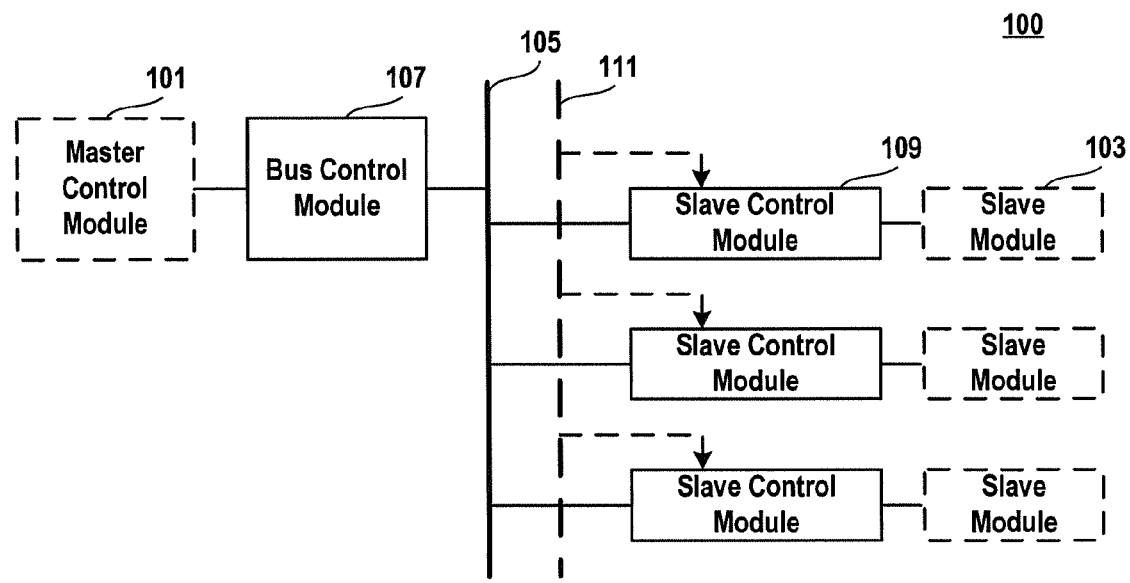
FIG. 1a shows a control circuitry module group 100 according to one embodiment of the present invention.

FIG. 1a shows a control circuitry module group 100 according to one embodiment of the present invention. The control circuitry module group 100 is configured for communication and/or power supply between a master control module 101 and at least one slave modules 103 in an electrical device.

In some examples, the electrical device may be a home appliance, an industrial equipment, or a numerical control machine, and the like, for example. Here, the master control module 101 refers to a module for controlling operation of the slave module 103 in the electrical device. The master control module 101 may generate a control signal that controls operation of the slave module 103 based on instructions inputted by a user or generated by an application, and it may be for example a microcontrol unit, a microprocessor, or other suitable electronic devices. The slave module 103 refers to an electronic or an electromechanic module coupled to the master control module 101 and operating under the control of a control signal, for example, a heater, a heat sink, a motor, or a sensor, etc. The slave module 103 may usually maintain its operation through a power applied thereon and changes its operation state based on different power supplies (for example, different supply powers, currents or voltages).

It should be noted that the amount of slave modules 103 as shown in FIG. 1a is merely exemplary, and those skilled in the art should understand that in actual application, the amount of slave modules 103 included in an electrical device is not be limited to two, which may be one, three or more. Besides, in actual application, a slave control module 109 may also correspond to two or more slave modules 103.

As shown in FIG. 1a, the control circuitry module group 100 comprises: a bus 105; a bus control module 107 coupled to the master control module 101 and the bus 105 and configured to receive a control signal from the master control module 101, add a target address in the control signal, and send the control signal with the target address to the bus 105; and at least one slave control modules 109 coupled to corresponding slave modules 103 and the bus 105, respectively, and configured to receive the control signal with the target address via the bus 105 and control power supply to the slave module 103 in response to the control signal.

In actual application, the slave control module 109 is further coupled to a power source line 111 so as to receive power supply from the power source line 111 (for example, power supply from a power source) and then in turn provide the power supply to the slave module 103.

In different embodiments, the slave control module 109 may include circuitry control elements such as a controllable switch, a relay, etc. The controllable switch or relay may be disposed on a power path from the power source line 111 to the slave module 103 and change the power supply to the slave module 103 based on the state change of the controllable switch or relay. For example, under the control of a control signal, the controllable switch may be opened so as to disconnect the power path, and thus the power supply to the slave module 103 is cut; conversely, the controllable switch may be closed so as to connect the power path, and thus the power supply to the slave module 103 is resumed.

Figure 1B:
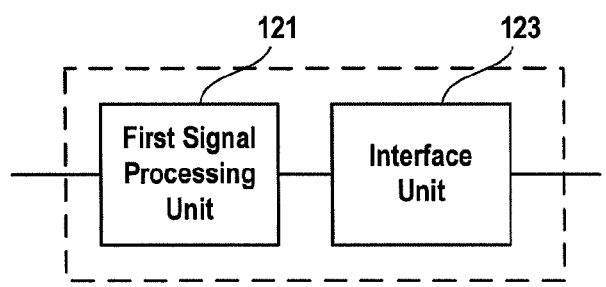
Figure 1C:
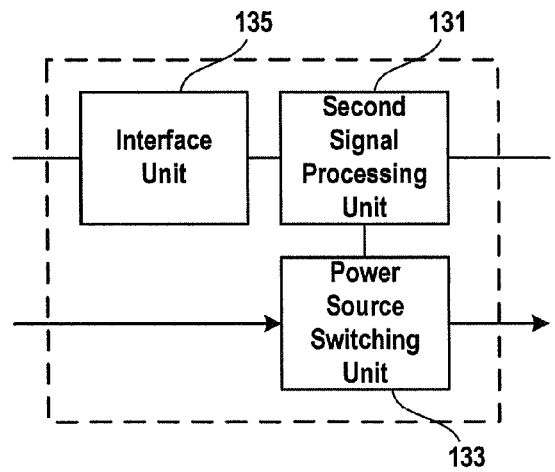

FIG. 1b shows an example of the bus control module in FIG. 1a, and FIG. 1c shows an example of a slave control module in FIG. 1a. Next, with reference to FIG. 1a to FIG. 1c, the operation of the control circuitry module group 100 will be further explained.

With reference to FIG. 1b, the bus control module 107 includes a first signal processing unit 121 configured to add a target address in a control signal, wherein the target address indicates an address of a slave control module 109 corresponding to the control signal. By adding the target address in the control signal, the control signal sent from the bus control module 107 to the bus 105 may be identified by a corresponding slave control module 109 so as to perform corresponding actions.

Furthermore, the bus control module 107 further includes an interface unit 123 configured to match signal transmission between the first signal processing unit 121 and the bus 105, such as signal timings, signal levels, signal formats, etc.

With reference to FIG. 1c, the slave control module 109 includes a second signal processing unit 131 and a power source switching unit 133. Here, the second signal processing unit 131 is configured to generate a power source switching signal based on a control signal. The power source switching unit 133 is coupled between the slave module 103 and the power source line 111, configured to switch a connection between the slave module 103 and the power source line 111 in response to the power source switching signal, thereby changing power supply to the slave module 103. Similar to the bus control module 107, the slave control module 109 likewise includes an interface unit 135 configured to match signal transmission between the second signal processing unit 131 and the bus 105. In some examples, the slave control module 109 may further include an AC/DC converting unit (not shown) either coupled between the power source switching unit 133 and the bus 105 or coupled between the power source switching unit 133 and the slave module 103, configured to convert the AC power supplied from the power source line 111 into a DC power so as to be adapted to supply to the slave module 103.

In some examples, the slave module 103 for example may be a module configured to generate sensing data such as a sensor. Such sensing data may reflect the operating state of the electrical device. For example, the slave module 103 may be a temperature sensor that may sense temperature variation within the electrical device and generate a feedback signal reflecting the temperature variation. In some other examples, the operating state of the slave module 103 might vary accordingly with the operating state of the electrical device. For example, the slave module 103 may be a heat sink (for example, a fan) whose heat dissipation efficiency might vary accordingly with local or global temperature change within the electrical device. In some further examples, the feedback signal may also be a response of the slave module 103 to the control signal provided by the master control module 101. Therefore, in this case, the slave control module 109 may be used to sense the operating state of the slave module 103 and generate a feedback signal based on the sensing result; or receive from the slave module 103 a feedback signal that includes sensing data reflecting the operating state of the electrical device or other data information. Further, the slave control module 109 sends the feedback signal to the bus 105 and then provides the feedback signal to the bus control module 107 via the bus 105. Correspondingly, the bus control module 107 may be further configured to receive a feedback signal and provides the feedback signal to the master control module 101.

Next, the working flow of the control circuitry module group 100 will be described in detail.

During operation of an electrical device equipped with the control circuitry module group 100, when the master control module 101 operates to control the slave module 103, the bus control 107 first receives a control signal provided by the master control module 101. Next, the bus control module 107 packs the control signal into a data packet and adds a target address into the control signal. Then, the bus control module 107 sends the packed control signal to the bus 105 via which the control signal is further distributed to each slave control module 109 coupled to the bus 105. Each slave control module 109, after receiving the packed control signal and the target address, will look up whether the target address matches its own address. If the target address matches the address of the slave control module 109, the slave control module 109 de-packs so as to obtain the control signal, and if the target address does not match the address of the slave control module 109, the data packet will be discarded. And then the slave control module 109 generates a power source switching signal based on the obtained control signal and controls power supply to the slave module 103 based on the power source switching signal.

When the slave module 103 feeds back its operating state to the master control module 101, the slave control module 109 first receives a feedback signal provided by the slave module 103. Then, the slave control module 109 packs the feedback signal. The slave control module 109 may also add in the feedback signal an address indicating the slave control module 109 that sends the feedback signal. Next, the slave control module 109 sends the feedback signal to the bus control module 107 via the bus 105. And then, the bus control module 107 de-packs the feedback signal and provides the de-packed feedback signal to the master control module 101.

It may be seen that the connections between each slave module 103 and the master control module 101 of the electrical device are coupled via the bus 105, and therefore it is unnecessary for the master control module 101 to set an individual interface for each slave module 103 to connect the slave module 103. This effectively reduces the complexity of the control line and improves the scalability of the system.

It should be noted that for the control circuitry module group 100 as shown in FIG. 1a, its bus 105 includes a data bus for transmitting data signals. In some other embodiments, the bus may further include a power bus for delivering power supply.

Figure 2:
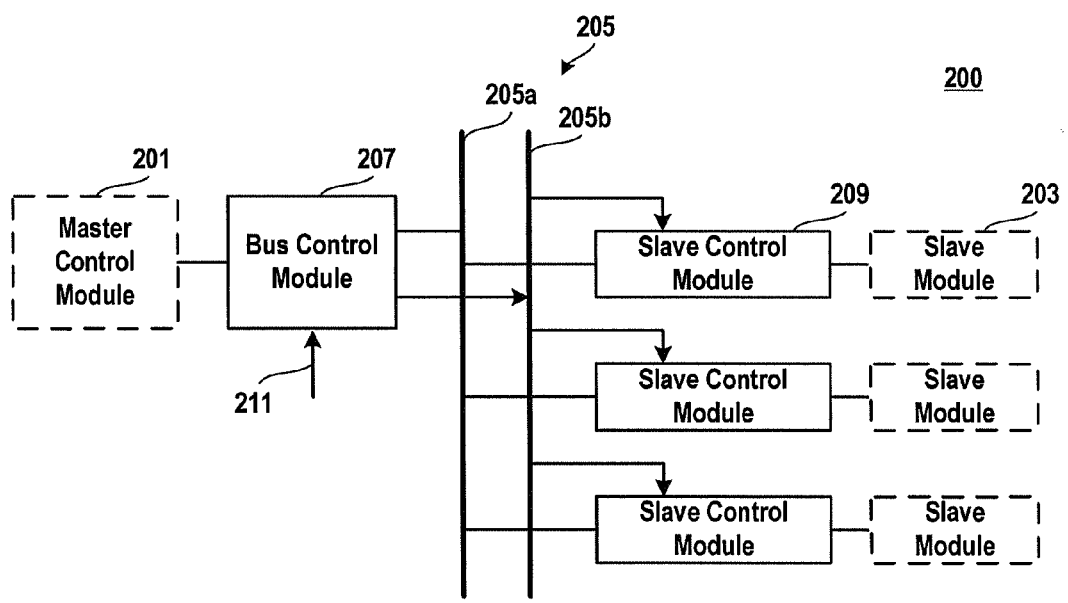
FIG. 2 shows a control circuitry module group 200 according to one embodiment of the present invention.

FIG. 2 shows a control circuitry module group 200 according to one embodiment of the present invention. In this embodiment, the control circuitry module group 200 includes a bus 205, a bus control module 207, and slave control modules 209.

In the embodiment of FIG. 2, the bus 205 includes a data bus 205a and a power bus 205b. Here, the data bus 205a is configured to transmit data signals between the bus control module 207 and the slave control modules 209, and the power bus 205b is configured to transmit power supply between the bus control module 207 and the slave control modules 209.

In particular, the bus control module 207 is coupled to the power source line 211 to receive power supply. Furthermore, the bus control module 207 is coupled to the power bus 205b so as to provide the obtained power supply to the power bus 205b. Correspondingly, the slave control modules 209 are coupled to the power bus 205b so as to receive power supply, and their connection with the slave modules 203 enable further provision of the power supply to the slave modules 203.

In actual application, the power bus 205b in the control circuitry module group 200 may be arranged together with the data bus 205a, which further decreases the number of lines in the electrical device and reduces the complexity of the control circuitry.

Figure 3A:
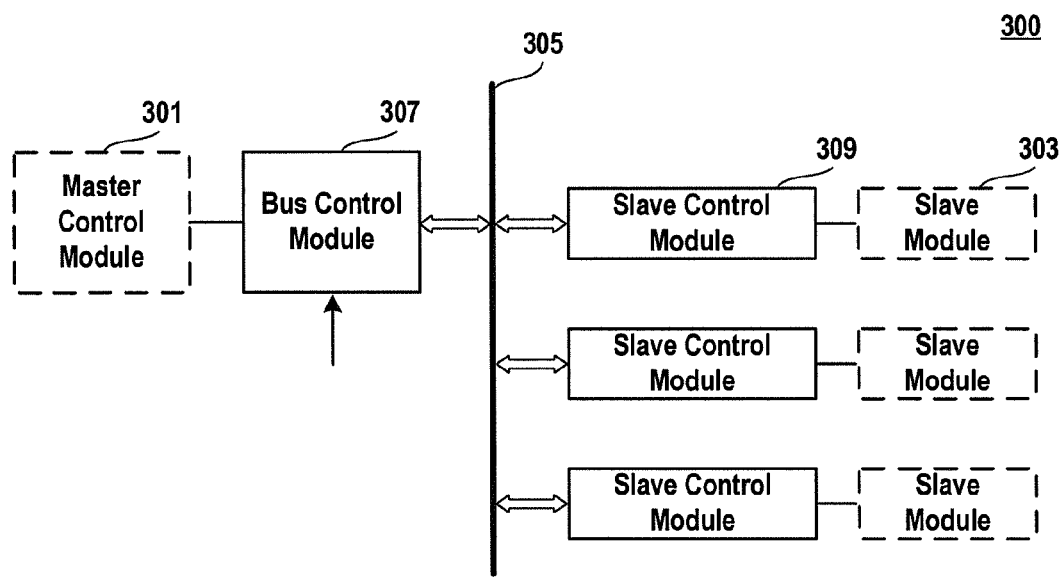
FIG. 3a shows a control circuitry module group 300 according to one embodiment of the present invention.

FIG. 3a shows a control circuitry module group 300 according to one embodiment of the present invention.

As shown in FIG. 3a, the control circuitry module group 300 includes a bus 305, a bus control module 307, and slave control modules 309. Here, the control circuitry module group 300 is a power line carrier communication circuitry, and the bus 305 is used for communication and power supply between the master control module 301 and the slave modules 303. In other words, the bus control module 307 and the slave control modules 309 are integrated with a modem unit that is capable of converting a control signal provided by the master control module and/or a feedback signal provided by a slave module 303 into a format suitable for power line transmission, such that the data signal may be transmitted via a bus 305 together with the power supply.

It may be seen that different from the prior art, it is unnecessary for the control circuitry module group 300 shown in FIG. 3a to use an additional data signal line to transmit data signals, which effectively reduces the amount of wiring harnesses within an electrical device. Furthermore, since the control circuitry module group 300 uses the bus 305 to transmit data signals and power supply between the master control module 301 and the slave modules 303, it is unnecessary for the master control module 301 to set an individual interface for each slave module 303 to connect the slave module 303, which further reduces the amount of wiring harnesses and reduces the complexity of the control circuitry module group 300.

Figure 3B:
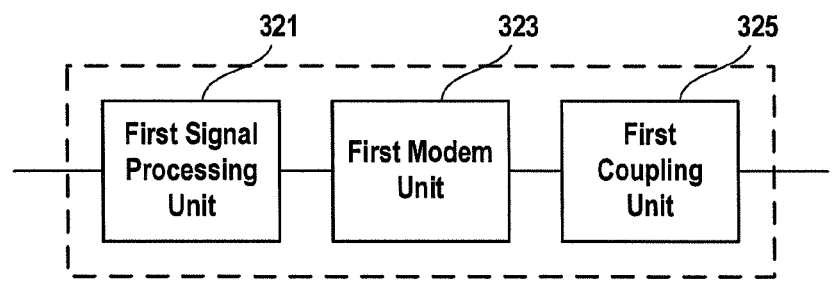
Figure 3C:
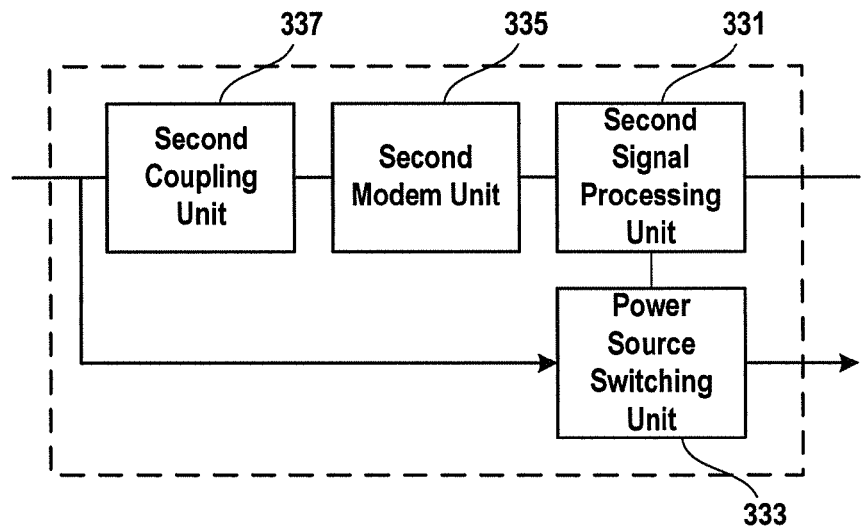

As mentioned above, in order to realize power line carrier communication based on the bus 305, a unit configured to modulate and/or demodulate signals has to be integrated into the bus control module 307 and the slave control modules 309. FIGS. 3b and 3c show an example of the bus control module 307 and the slave control module 309 in FIG. 3a, respectively.

As shown in FIG. 3b, the bus control module 307 includes a first signal processing unit 321 configured to add in a control signal a target address indicating an address of a slave control module 309 corresponding to the control signal; a first modem unit 323 coupled to the first signal processing unit 321 and configured to modulate the control signal and/or demodulate a feedback signal fed back from the slave control module 309; and a first coupling unit 325 coupled between the first modem unit 323 and the bus 305 and configured to interchange the modulated control signal and/or the feedback signal between the first modem unit 323 and the bus 305.

As shown in FIG. 3c, the slave control module 309 includes a second signal processing unit 331 configured to generate a power source switching signal based on a control signal; a power source switching unit 333 coupled between the slave module 303 and the bus 305 and configured to switch a connection between the slave module 303 and the bus 305 in response to the power source switching signal; a second modem unit 335 coupled to the second signal processing unit 331 and configured to demodulate the control signal and/or modulate the feedback signal; and a second coupling unit 337 coupled between the second modem unit 335 and the bus 305 and configured to interchange the modulated control signal and/or the feedback signal between the second modem unit 335 and the bus 305.

Here, the first modem unit 323 and the second modem unit 335 may adopt a carrier modulation technique such as Orthogonal Frequency Division Multiplexing to implement signal modulation and/or demodulation. It would be appreciated that in some examples, the slave module 303 will not send a feedback signal to the master control module 301; correspondingly, the first modem unit 323 includes a modulator configured to modulate a control signal and the second modem unit 335 includes a demodulator configured to demodulate the modulated control signal. In some other examples, the slave module 303 may send a feedback signal to the master control module 301; correspondingly, the second modem unit 335 may further include a modulator configured to modulate the feedback signal and the first modem unit 323 may further include a demodulator configured to demodulate the modulated feedback signal.

Figure 3D:
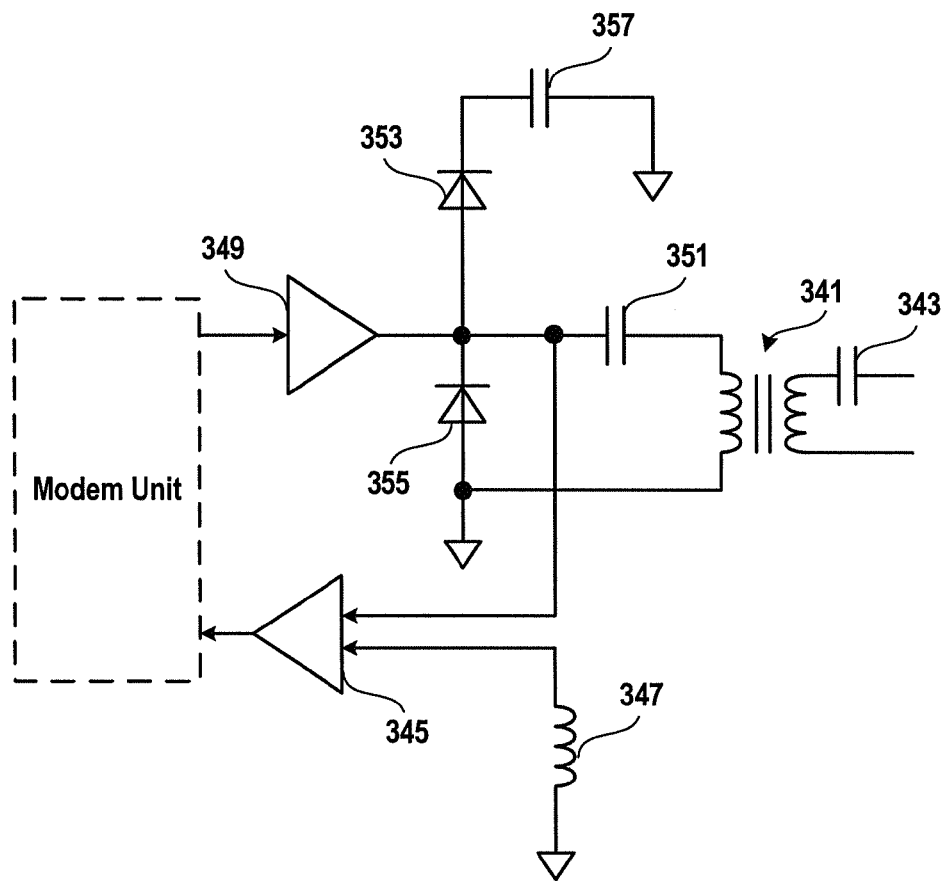
FIG. 3d shows an example of a first coupling unit and a second coupling unit.

The first coupling unit 325 and the second coupling unit 337 may adopt a capacitive coupling circuit or an inductive coupling circuit to realize signal coupling with the bus 305. FIG. 3d shows an example of the first coupling unit 325 and the second coupling unit 337.

As shown in FIG. 3d, the coupling units are coupled to the bus 305 through a transformer 341 and a coupling capacitor 343, wherein the transformer 341 may isolate the high-amplitude valued voltage on the bus 305 from other portions of the coupling unit. The coupling capacitor 343 and a secondary coil of the transformer 341 form a high-pass filter for filtering the interface from the operating frequency (50 or 60 Hz) on the bus 305. The secondary coil of the transformer 341 is coupled to an input terminal of a first operational amplifier 345, and the other input terminal of the first operational amplifier 345 is coupled to a reference inductor 347. When receiving a signal from the bus 305, the first operational amplifier 345 amplifiers the signal difference between the two input terminals and outputs it to the corresponding modem unit.

On the other hand, the coupling unit further includes a second operational amplifier 349 whose input terminal receives a modulated control signal and whose output terminal is coupled via a coupling capacitor 351 to a primary coil of the transformer 341 so as to provide the control signal to the bus 305 via the transformer 341. In this example, the output terminal of the second operational amplifier 349 is further coupled with clamping diodes 353 and 355 in series, and the clamping diodes 353 and 355 are used for providing surging protection so as to protect the second operational amplifier 349 from being damaged due to instant high-voltage pulse. Here, one terminal of the clamping diode 353 is coupled to a reference potential via a bypass capacitor 357.

It should be noted that the coupling units in FIG. 3d merely exemplarily illustrate the circuit structure that may be adopted by the first coupling unit 325 and the second coupling unit 337. In actual application, in different embodiments, the first coupling unit 325 and the second coupling unit 337 may also adopt other circuit structure that may couple the modem units to the bus.

Figure 4A:
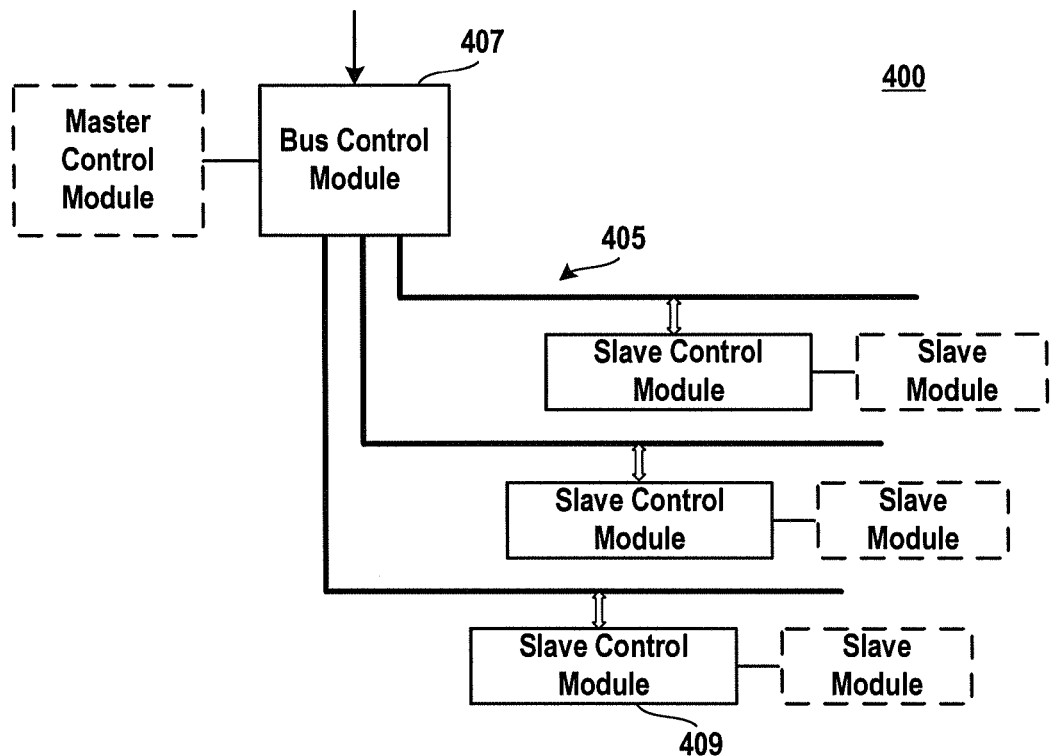
FIG. 4a shows a control circuitry module group 400 according to one embodiment of the present invention.

In some electrical devices, different slave modules may require power supplies with different voltage amplitudes. For example, a module such as a sensor that has a relatively low rational working power may require a voltage of power supply far lower than a module such as a heat sink or a heater that has a relatively high rational working power. FIG. 4a shows a control circuitry module group 400 according to one embodiment of the present invention. In the control circuitry module group 400 as shown in FIG. 4a, the bus 405 includes multiple bus branches, wherein the voltage amplitude of power supply provided by each bus branch may be different. Such bus branches are coupled to different slave control modules 409, respectively, and to a same bus control module 407.

It may be seen that for each slave control module 409 in the control circuitry module group 400, it is still coupled between one slave module 403 and one bus branch, and therefore, the slave control module 409 may still adopt the structure of the slave control module 309 as shown in FIG. 3c, for example. However, for the bus control module 407, since it is required to be coupled to multiple bus branches, the circuit structure of the bus control module 407 is different from that of the bus control module 307 as shown in FIG. 3b.

Figure 4B:
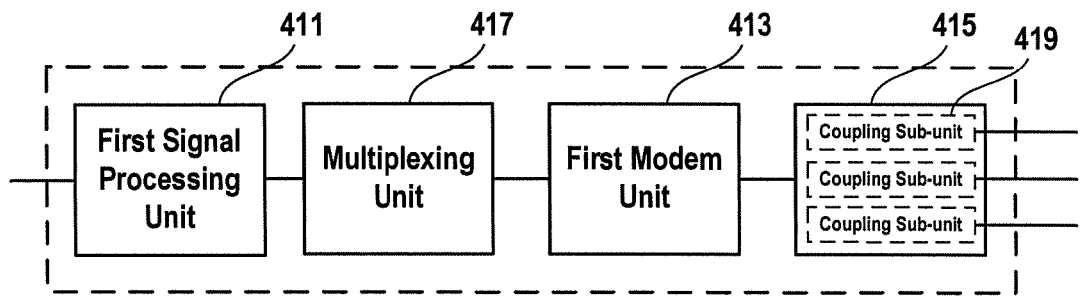

FIG. 4b shows an example of the bus control module in FIG. 4a.

As shown in FIG. 4b, the bus control module includes a first signal processing unit 411, a first modem unit 413, and a first coupling unit 415. Here, the first coupling unit 415 includes a plurality of coupling sub-units 419 each coupled to one bus branch, respectively, so as to implement, via the bus branch, communication and power supply with a slave control module coupled to the bus branch.

Furthermore, the bus control module further includes a multiplexing unit 417 with multiple data signal channels, which is coupled between the first signal processing unit 411 and the first modem unit 413, and configured to select one data signal channel from the multiple data signal channels so as to interchange signals between the first modem unit 413 and the first signal processing unit 411, thereby implementing communications between slave modules coupled to various bus branches and the master control module. In actual application, the multiplexing unit 417 may receive a selection signal from the master control module so as to switch between data signal channels.

It is seen that since there is a multiplexing unit 417 to implement switching between the data signal channels, the bus control module is only required to have one modem unit 413 that is shared by a plurality of coupling sub-units 419 included in the first coupling unit 415. This may reduce used number of modem units in the bus control module, thereby reducing hardware costs.

In one example, each of the coupling sub-units 419 in the first coupling unit 415 may include a primary coil and a secondary coil, wherein each secondary coil is coupled to one bus branch through a coupling capacitor. In another example, the first coupling unit 405 may include a secondary coil, and each coupling sub-unit 419 includes a secondary coil and the plurality of coupling sub-units 419 share a secondary coil, wherein each secondary coil is coupled to one bus branch through a coupling capacitor respectively. Such a coupling unit further reduces used number of coils, thereby reducing hardware costs.

Figure 5:
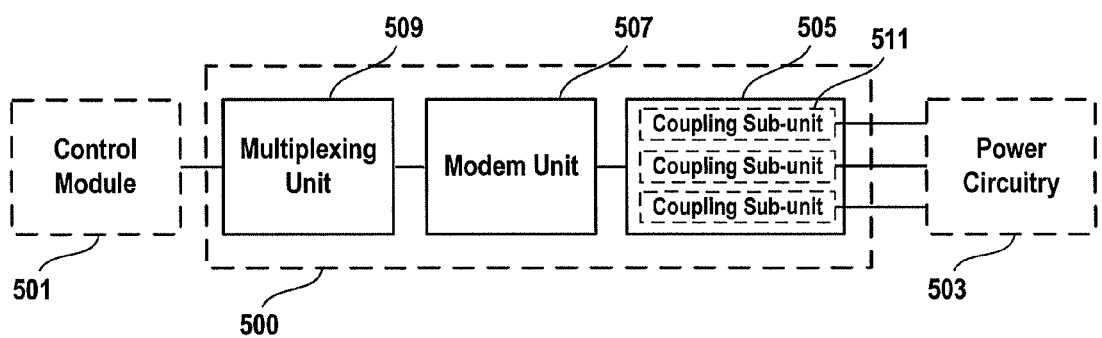
FIG. 5 shows a modem device 500 according to one embodiment of the present invention.

FIG. 5 shows a modem device 500 according to one embodiment of the present invention.

As shown in FIG. 5, the modem device 500 is configured for communication between a control module 501 and a power circuitry 503 in the electrical device, wherein the power circuitry 503 includes a plurality of power lines, and the modem device 500 includes a coupling unit 505, a modem unit 507, and a multiplexing unit 509.

The modem unit 507 is coupled between the coupling unit 505 and the multiplexing unit 509, configured to demodulate a modulated signal from the power circuitry 503 into a data signal and provide it to the multiplexing unit 509, or modulate a data signal from the multiplexing unit 509 into a modulated signal and provide it to the coupling unit 505;

The coupling unit 505 includes a plurality of coupling sub-units 511, wherein each coupling sub-unit is coupled to one power line of the power circuitry 503, respectively, and configured to interchange modulated signals between the modem unit 507 and the power circuitry 503;

The multiplexing unit 509 includes multiple data signal channels configured to receive a selection signal and select one data signal channel from the multiple data signal channels in response to the selection signal so as to interchange data signals between the modem unit 507 and the control module 501.

In one example, each coupling sub-unit 511 includes a primary coil and a secondary coil, wherein each secondary coil is coupled to one power line through a coupling capacitor, respectively.

In another example, the coupling unit 505 may includes a primary coil, each coupling sub-unit 511 includes a secondary coil, and the plurality of coupling sub-units 511 share a primary coil, wherein each secondary coil is coupled to one power line through a coupling capacitor.

It is seen that since the modem device 500 includes a multiplexing unit 509 to switch between data signal channels, the modem device 500 is only required to include one modem unit 507 that is shared by the plurality of coupling sub-units 509 included in the coupling unit 505. This may reduce used number of modem units, thereby reducing hardware costs.

Although the present invention has been explained and described in the drawings and the aforementioned description, it should be noted that the explanation and description is only illustrative and exemplary, instead of limitative, and the present invention is not limited to the above embodiments.

A person of normal skill in the art may understand and implement other variations of the disclosed embodiments through studying the description, the disclosed content, the drawings, and the appended claims. In the claims, the wording "comprise" or "include" does not exclude other elements and steps, and the wording "a" or "an" does not exclude plurality. In actual applications of the present invention, a single element may perform the functions of a plurality of technical features as recited in the claims. Any reference sign in the claims should not be understood as a limitation to the scope.

What is claimed is:

1. A control circuitry module group for communication and/or power supply between a master control module and at least one slave module in an electrical device, the control circuitry module group comprising:
a bus;
a bus control module coupled to the master control module and the bus, and configured to receive a control signal from the master control module, add a target address in the control signal, and send the control signal with the target address to the bus;
at least one slave control module each coupled to a respective slave module and the bus, respectively, and configured to receive the control signal with the target address via the bus and control power supply to the slave module in response to the control signal;
a first signal processing unit configured to add the target address in the control signal, wherein the target address indicates an address of a slave control module corresponding to the control signal;
a first modem unit coupled to the first signal processing unit, and configured to modulate and/or demodulate the control signal and/or a feedback signal fed back from the slave control module; and
a first coupling unit coupled between the first modem unit and the bus, and configured to interchange the modulated control signal and/or feedback signal between the first modem unit and the bus.

2. The control circuitry module group according to claim 1, wherein:
the slave control module is further configured to receive a feedback signal from the slave module and provide the feedback signal to the bus control module via the bus; and
the bus control module is further configured to receive the feedback signal and provide the feedback signal to the master control module.

3. The control circuitry module group according to claim 1, the bus further comprises:
a power bus coupled between a power source line and the at least one slave control module, and configured to provide power supply to the slave control module.

4. The control circuitry module group according to claim 1 the bus control module comprising:
a first signal processing unit configured to add the target address in the control signal, wherein the target address indicates an address of a slave control module corresponding to the control signal.

5. The control circuitry module group according to claim 1, the slave control module comprising:
a second signal processing unit configured to generate a power source switching signal based on the control signal; and
a power source switching unit coupled between the slave module and a power source line, and configured to switch a connection between the slave module and the power source line in response to the power source switching signal.

6. The control circuitry module group according to claim 5, wherein the second signal processing unit is further configured to receive a feedback signal and provide the feedback signal to the bus.

7. The control circuitry module group according to claim 5, wherein the power source switching unit comprises a relay or a controllable switch.

8. The control circuitry module group according to claim 1, wherein the control circuitry module group is a power line carrier communication circuitry, and the bus is configured to implement communication and power supply between the master control module and the at least one slave module.

9. The control circuitry module group according to claim 1, wherein the bus comprises multiple bus branches, and the first coupling unit further comprises a plurality of coupling sub-units, wherein each coupling sub-unit is coupled to one of the multiple bus branches, respectively; and
wherein the bus control module further comprises a multiplexing module having multiple data signal channels, configured to select one data signal channel from the multiple data signal channels to interchange signals between the first modem unit and the first signal processing unit.

10. The control circuitry module group according to claim 9, wherein each of the coupling sub-units comprises a primary coil and a secondary coil, wherein each secondary coil is coupled to one of the bus branches via a coupling capacitor, respectively.

11. The control circuitry module group according to claim 9, wherein the first coupling unit comprises a primary coil, each of the coupling sub-units comprises a secondary coil, and the plurality of coupling sub-units share the primary coil, wherein each secondary coil is coupled to one of the bus branches via a coupling capacitor, respectively.

12. The control circuitry module group according to claim 8, wherein the slave control module comprises:
a second signal processing unit configured to generate a power source switching signal based on the control signal;
a power source switching unit coupled between the slave module and the bus, and configured to switch a connection between the slave module and the bus in response to the power source switching signal;
a second modem unit coupled to the second signal processing unit, and configured to modulate and/or demodulate the control signal; and
a second coupling unit coupled between the second modem unit and the bus, and configured to interchange the modulated control signal and/or feedback signal between the second modem unit and the bus.

13. An electrical device comprising the control circuitry module group, the master control module, and the at least one slave modules according to claim 1.

14. The electrical device according to claim 13, wherein the slave module comprises a heating module, a heat-dissipation module, a motor, or a sensor.

15. A modem device configured for communication between a control module and a power circuitry in an electrical device, the power circuitry comprising a plurality of power lines, the modem device comprises a coupling unit, a modem unit, and a multiplexing unit, wherein
the modem unit is coupled between the coupling unit and the multiplexing unit, and is configured to demodulate a modulated signal from the power circuitry into a data signal and provide it to the multiplexing unit, or to modulate a data signal from the multiplexing unit into a modulated signal and provide it to the coupling unit;

the coupling unit comprises a plurality of coupling sub-units, wherein each coupling sub-unit is coupled to one of the power lines of the power circuitry, respectively, and is configured to interchange the modulated signal between the modem unit and the power circuitry; and the multiplexing unit comprises multiple data signal channels, configured to receive a selection signal and select one data signal channel from the multiple data signal channels in response to the selection signal to interchange data signals between the modem unit and the control module.

16. The modem device according to claim 15, wherein each of the coupling sub-units comprises a primary coil and a secondary coil, wherein each secondary coil is coupled to one of the power lines of the power circuitry via a coupling capacitor, respectively.

17. The modem device according to claim 15, wherein the coupling unit comprises a primary coil, each of the coupling sub-units comprises a secondary coil, and the plurality of coupling sub-units share the primary coil, wherein each secondary coil is coupled to one of the power lines of the power circuitry via a coupling capacitor.

* * * * *